US006666527B2

(12) United States Patent
Gill et al.

(10) Patent No.: US 6,666,527 B2

(45) Date of Patent: Dec. 23, 2003

(54) ELECTRO-HYDRAULIC BRAKE ACTUATING DEVICE FOR A TRAILER

(75) Inventors: George Patrick Gill, Caledonia, IL (US); David Leonard Swanson, Rockford, IL (US)

(73) Assignee: Dura Global Technologies Inc., Rochester Hills, MI (US)

( * ) Notice: Subject to any disclaimer, the term of this patent is extended or adjusted under 35 U.S.C. 154(b) by 70 days.

(21) Appl. No.: 09/955,450

(22) Filed: Sep. 18, 2001

(65) Prior Publication Data

US 2002/0180257 A1 Dec. 5, 2002

Related U.S. Application Data

(60) Provisional application No. 60/295,686, filed on Jun. 4, 2001.

(51) Int. Cl.[7] .................................................. B60T 7/20

(52) U.S. Cl. ....................................... 303/7; 188/112 R

(58) Field of Search ......................... 188/112 R, 112 A; 303/7, 10, 11

(56) References Cited

U.S. PATENT DOCUMENTS 2,127,890 A 8/1938 Sills
2,142,514 A 1/1939 Jones
2,248,435 A 7/1941 Pleines
2,940,561 A 6/1960 Atkin
2,941,844 A 6/1960 Stelzer
3,171,694 A 3/1965 Sisson
3,695,731 A 10/1972 England
3,756,666 A 9/1973 Leiber
3,768,870 A 10/1973 Howard .................. 188/112 R
3,834,767 A 9/1974 Bullinger
3,880,472 A 4/1975 Lewis
3,951,464 A 4/1976 Donahue
3,985,395 A 10/1976 Watanabe
3,995,911 A 12/1976 Kasselmann
4,054,425 A 10/1977 Sherman
4,099,790 A 7/1978 Hipps
4,280,737 A 7/1981 Hipps
4,402,553 A 9/1983 Hipps
4,787,205 A 11/1988 Fontaine
5,213,396 A 5/1993 Avery
5,382,085 A 1/1995 Zbinden ................ 188/112 R
5,626,402 A 5/1997 Saffran
5,806,937 A 9/1998 Brunson

*Primary Examiner*—Matthew C. Graham

(74) *Attorney, Agent, or Firm*—Richard M. Mescher; Casimir R. Kiczek

(57) ABSTRACT

A trailer brake system includes a control sensor adapted to provide a signal when the braking system of the tow vehicle is actuated, at least one trailer brake actuated by pressurized brake fluid, a brake fluid reservoir, a brake fluid pump receiving fluid from the brake fluid reservoir, and a first solenoid valve connected to the brake fluid pump and directly connected to the trailer brake. A brake fluid accumulator receives pressurized brake fluid from the brake fluid pump and is connected to the first solenoid valve to quickly provide pressurized brake fluid to the trailer brake to increase the braking force. A second solenoid valve connects the trailer brake and the brake fluid reservoir so that brake fluid can be returned to the reservoir to reduce to reduce the fluid pressure and resulting braking force. A feedback pressure sensor is capable of generating a signal that represents braking force applied to the trailer brake. A controller is in communication with the control sensor, the first solenoid valve, the second solenoid valve, and the feed back sensor and is adapted to selectively open the first valve to increase braking force applied to the trailer brake and to open the second solenoid valve to decrease braking force to the trailer brake. The controller automatically provides a predetermined braking force to the trailer brake by selectively opening and closing the first and second valves as required to maintain the predetermined pressure. When the control sensor indicates the degree to which the braking system of the tow vehicle is actuated, the controller is can automatically provide different braking forces depending on the degree to which the braking system of the tow vehicle is actuated.

23 Claims, 4 Drawing Sheets

CONTROLLER
60
58
12
62
BRAKE FLUID ACCUMULATOR
30
68
66
64
70
36
PRESSURE SWITCH
54
FIRST SOLENOID VALVE (N.C)
PRESSURE TRANSDUCER
38
28
32
46
BRAKE FLUID RESERVOIR/ MASTER CYCLINDER
14
CHECK VALVE
44
50
48
SECOND SOLENOID VALVE (N.O.)
18
20
16
42
PUMP
34
52
24
CONTROL SENSOR
BRAKE FLUID RESERVOIR
40
22
56
BRAKE PEDAL
26
10
TOW VEHICLE BRAKES
TOW VEHICLE
TRAILER
TRAILER BRAKES

ELECTRO-HYDRAULIC BRAKE ACTUATING DEVICE FOR A TRAILER

CROSS-REFERENCE TO RELATED APPLICATIONS

This application claims benefit of Provisional Application No. 60/295,686 filed on Jun. 4, 2001.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a vehicle brake system and, more particularly, to a hydraulic brake system for a trailer which operates in cooperation with a brake system of a tow vehicle.

BACKGROUND OF THE INVENTION

Tow vehicle/trailer brake systems have long presented certain problems. The tow vehicle is often not equipped with air brake systems and therefore the trailer cannot be provided with air brakes powered by the tow vehicle air brake system. To provide the trailer with a self powered air brake system is expensive. Even when the tow vehicle is provided with an air brake system, there must be air hose connections between the tow vehicle and the trailer which are inconvenient. One solution has been to provide electric trailer brake systems. In these electric brake systems, however, the braking force is often inadequate because it is limited by the size of the magnetic armature in the brake. Also, electric brake systems are maintenance intensive. Another solution has been to provide the tow vehicle with a hydraulic system capable of operating brakes of both the tow vehicle and the trailer. With these hydraulic brake systems, however, there must be hydraulic hose connections between the tow vehicle and the trailer which are inconvenient. A further solution has been to provide the trailer with its own hydraulic circuit. These hydraulic brake systems, however, have been complicated, unreliable, and expensive. Accordingly, there is a need in the art for an improved trailer brake system.

SUMMARY OF THE INVENTION

The present invention provides a trailer brake system which overcomes at least some of the above-noted problems of the related art. According to the present invention, a trailer brake system includes, in combination, a control sensor adapted to provide a signal when the braking system of the tow vehicle is actuated, at least one brake actuated by pressurized brake fluid, a brake fluid reservoir, a brake fluid pump connected to the brake fluid reservoir, a first valve connected to the brake fluid pump and directly connected to the at least one brake, and a second valve connecting the at least one brake and the brake fluid reservoir. A controller is in communication with the control sensor, the first valve, and the second valve and is adapted to open the first valve to increase braking force applied to the at least one brake and to open the second valve to decrease braking force to the at least one brake. A feedback sensor is in communication with the controller and is capable of generating a signal that represents braking force applied to the at least one brake.

According to another aspect of the present invention, a trailer brake system includes, in combination a control sensor adapted to provide a signal when the braking system of the tow vehicle is actuated, at least one brake actuated by pressurized brake fluid, a source of pressurized brake fluid, a first valve connected to the source of pressurized brake fluid and directly connected to the at least one brake, a brake fluid reservoir, and a second valve connecting the at least one brake and the brake fluid reservoir. A controller is in communication with the control sensor, the first valve, and the second valve and is adapted to open the first valve to increase braking force applied to the at least one brake and to open the second valve to decrease braking force to the at least one brake. A feedback sensor is in communication with the controller and is capable of generating a signal that represents braking force applied to the at least one brake.

According to yet another aspect of the present invention, a trailer brake system includes, in combination, a control sensor adapted to provide a signal when the braking system of the tow vehicle is actuated, at least one brake actuated by pressurized brake fluid, a brake fluid reservoir, a brake fluid pump connected to the brake fluid reservoir, and a first solenoid valve connected to the brake fluid pump and directly connected to the at least one brake. An accumulator is adapted to hold pressurized brake fluid and is connected to the first solenoid valve to provide pressurized brake fluid thereto and to the brake fluid pump to receive brake fluid therefrom. A second solenoid valve connects the at least one brake and the brake fluid reservoir. A controller in communication with the control sensor, the first solenoid valve, and the second solenoid valve is adapted to open the first solenoid valve to increase braking force applied to the at least one brake and to open the second solenoid valve to decrease braking force to the at least one brake. A feedback sensor in communication with the controller is capable of generating a signal that represents braking force applied to the at least one brake. The controller is adapted to automatically provide a predetermined braking force to the at least one brake by opening and closing the first and second solenoid valves when the controller receives a signal from the control sensor indicating the braking system of the tow vehicle is actuated.

From the foregoing disclosure and the following more detailed description of various preferred embodiments it will be apparent to those skilled in the art that the present invention provides a significant advance in the technology and art of trailer brake systems. Particularly significant in this regard is the potential the invention affords for providing a high quality, reliable, low cost assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
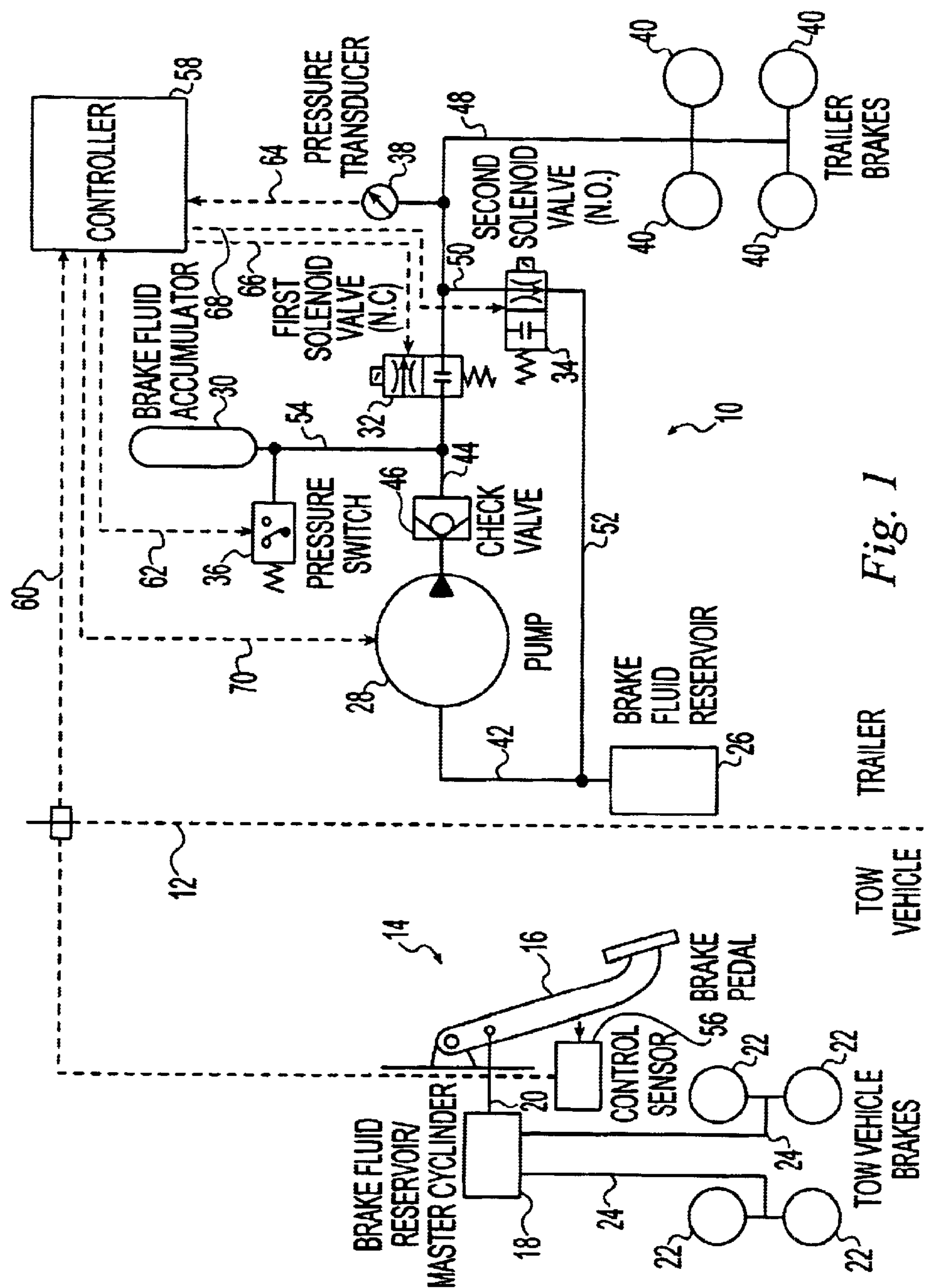
FIG. 1 is a schematic view of a trailer brake system according to a preferred embodiment of the present invention.

It should be understood that the appended drawings are not necessarily to scale, presenting a somewhat simplified representation of various preferred features illustrative of the basic principles of the invention. The specific design features of a trailer brake system as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the trailer brake system illustrated in the drawings. In general, up or upward refers to an upward direction within the plane of the paper in FIGS. 1–3 and down or downward refers to a downward direction within the plane of the paper in FIGS. 1–3. Also in general, fore or forward refers to a direction toward the front of the tow vehicle and trailer, that is, to the left within the plane of the paper in FIGS. 1–3 and aft or rearward refers to a direction toward the rear of the tow vehicle and trailer, that is, to the right within the plane of the paper in FIGS. 1–3.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved trailer brake system 10 disclosed herein. The following detailed discussion of various alternative and preferred embodiments will illustrate the general principles of the invention with reference to a preferred embodiment. Other embodiments suitable for other applications will be apparent to those skilled in the art given the benefit of this disclosure.

Referring now to the drawing, FIG. 1 schematically shows a trailer brake system 10 according to a preferred embodiment of the present invention. All components to the left of the broken line 12 are preferably carried by the tow vehicle while all components to the right of the broken 12 are preferably carried by the trailer. It is noted that the present invention can be utilized with any type of vehicle system having a motorized tow vehicle with at least one brake and a trailer with at least one brake and pulled by the tow vehicle. The tow vehicle can be, for example an automobile, truck, bus, van, recreational vehicle, tractor, or the like while the trailer can be, for example a camper, recreational, boat, moving, storage, or freight trailer, tag axle, or the like.

As shown in FIG. 1, the illustrated tow vehicle brake system 14 includes a pivotable brake lever or pedal 16 which when depressed actuates a piston in a master cylinder 18 via a mechanical linkage 20 or alternatively via an electrical wire. The actuated master cylinder piston delivers hydraulic brake fluid to tow vehicle brakes 22 via brake fluid conduits 24. Although shown schematically it is understood that each of the tow vehicle brakes 22 can include a hydraulic wheel cylinder operable by fluid force delivered thereto by the brake fluid conduits, brake shoes or the like operable by the wheel cylinder to brake rotation of a wheel, and a spring member operable to release the brake shoes whenever fluid pressure is reduced. This illustrated tow vehicle brake system 14 is of course standard but it is noted that other suitable tow vehicle brake systems known to those skilled in the art such as, for example, hydraulic drum brakes or disc brakes can be utilized within the scope of the present invention.

The trailer brake system 10 includes a hydraulic brake fluid circuit and a electrical control circuit. The brake fluid circuit includes a brake or hydraulic fluid reservoir 26, a brake or hydraulic fluid pump 28, a brake or hydraulic fluid accumulator 30, first and second solenoid valves 32, 34, a pressure sensor or switch 36, a feedback sensor or pressure transducer 38, and trailer brakes 40. A first brake fluid conduit 42 connects an inlet port of the pump 28 to the fluid reservoir 26 so that a supply of brake fluid is available to the pump 28. A second brake fluid conduit 44 connects an outlet port of the pump 28 with an inlet of the first solenoid valve 32. The first solenoid valve 32 is preferably a normally closed (N.C.) valve, that is, a valve that is biased to a closed condition and actuatable to an open condition.

The accumulator 30 is located between the pump 28 and the first solenoid valve 32. The accumulator 30 can be of any suitable type such as, for example, a gas or spring accumulator. A one-way check valve 46 is preferably provided between the accumulator 30 and the outlet port of the pump 28. A third brake fluid conduit 48 connects an outlet of the first solenoid valve 32 with the trailer brakes 40. It is noted that the first solenoid valve 32 is directly connected to the trailer brakes without the use of a hydraulic actuator, master cylinder or the like therebetween. A fourth brake fluid conduit 50 connects the trailer brakes 40, via the third fluid conduit 48 in the illustrated embodiment, to an inlet of the second solenoid valve 34. The second solenoid valve 34 is preferably a normally open (N.O.) valve, that is, a valve that is biased to an open condition and actuatable to a closed condition. A fifth brake fluid conduit 52 connects an outlet of the second solenoid valve 32 to the brake fluid reservoir 26.

The pressure switch 36 is positioned to detect fluid pressure in the accumulator 30, that is, fluid pressure in the circuit between the pump 28 and the first solenoid valve 32. In the illustrated embodiment, the pressure switch 36 is connected to an accumulator conduit 54 which connects the accumulator 30 to the second brake fluid conduit 44. The pressure transducer 38 is positioned to detect fluid pressure at the trailer brakes 40, that is, fluid pressure in the circuit between the first solenoid valve 32 and the trailer brakes 40. In the illustrated embodiment the pressure transducer 38 is in communication with the third brake fluid conduit 48. It is noted that other suitable types of feedback sensors 38 known to those skilled in the art which provide a signal which indicate the braking force applied to the trailer brakes can be utilized within the scope of the present invention. Although shown schematically it is understood that each of the trailer brakes 40 can include a hydraulic wheel cylinder operable by fluid force delivered thereto by the third brake fluid conduit, brake shoes or the like operable by the wheel cylinder to brake rotation of a wheel, and a spring member operable to release the brake shoes whenever fluid pressure is reduced. It is noted that other suitable trailer brakes known to those skilled in the art such as, for example, hydraulic drum or disc brakes can alternatively be utilized within the scope of the present invention.

The illustrated electrical control circuit includes a control sensor or switch 56 and a central processing unit or controller 58. The control sensor 56 is adapted to provide a signal which indicates that the tow vehicle braking system 14 has been actuated and is preferably adapted to provide a signal which is representative of the degree to which the tow vehicle braking system 14 has been actuated. As shown in FIG. 1, the control sensor 56 can be carried by the tow vehicle and of the type positioned at or near the brake pedal 16 to sense or detect physical movement of the brake pedal 16. This type of sensor is particularly advantageous when the tow vehicle brake system is a "brake-by-wire" system, that is, a system having a sensor which detects movement the brake pedal and sends electrical signals to an electric actuator located at the brake master cylinder to apply a brake force because such a sensor is already present as part of the tow vehicle brake system 14. It is noted that other suitable control sensors 56 known to those skilled in the art which provide a signal which indicates that the tow vehicle braking system 14 has been actuated can be utilized within the scope of the present invention.

Figure 2:
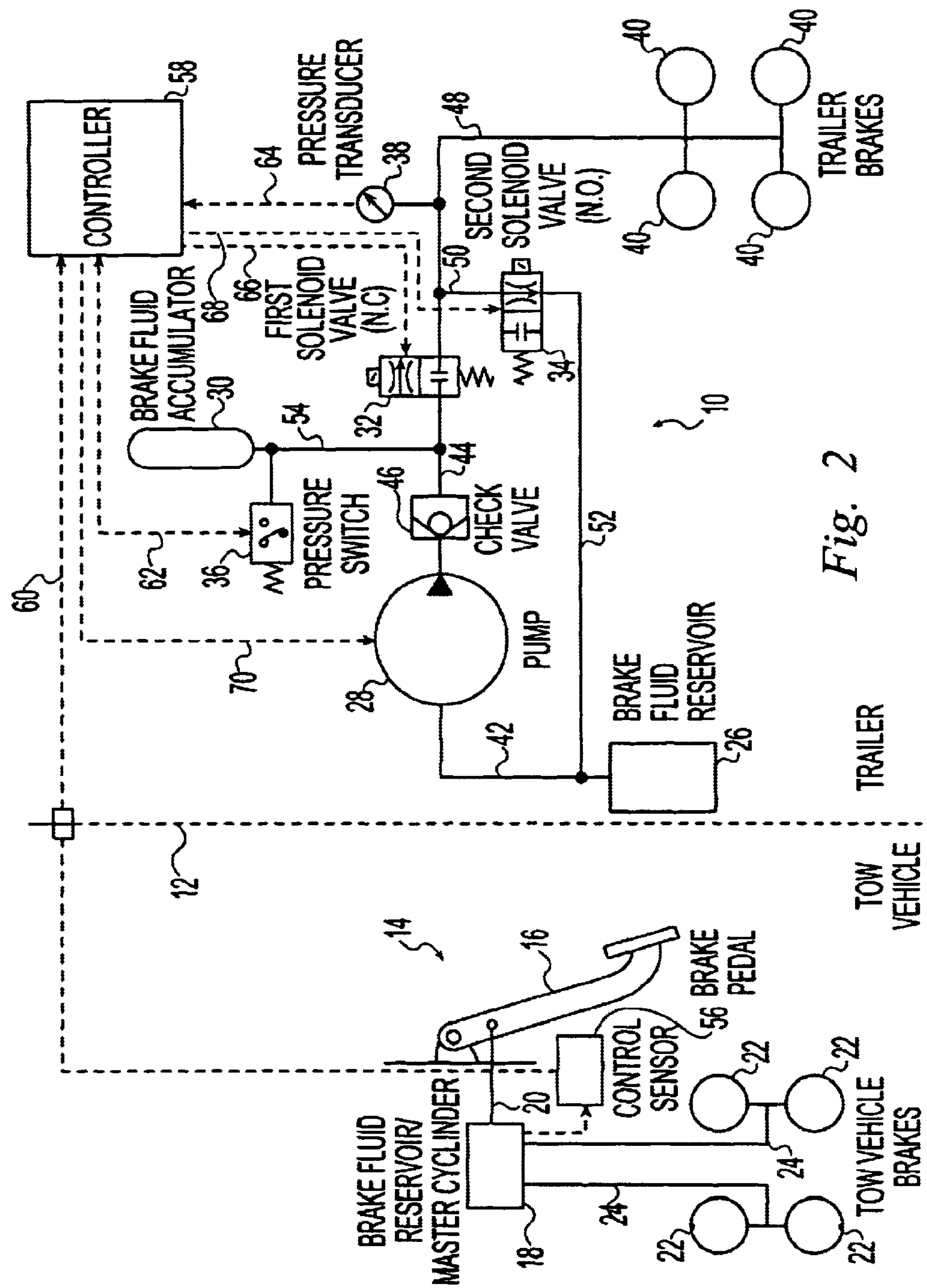
FIG. 2 is a schematic view showing a variation of the trailer brake system of FIG. 1 wherein the control sensor indicates brake fluid pressure of the tow vehicle.

As shown in FIG. 2, the control sensor 56 can also be carried by the tow vehicle and of a type adapted to sense brake fluid pressure delivered to the tow vehicle brakes 22. For example, the control sensor 56 can be a pressure transducer connected to the master cylinder 18. The pressure transducer can sense brake fluid pressure in the master cylinder, and thus how aggressive the tow vehicle braking, and provide a proportional signal to the controller 58.

Figure 3:
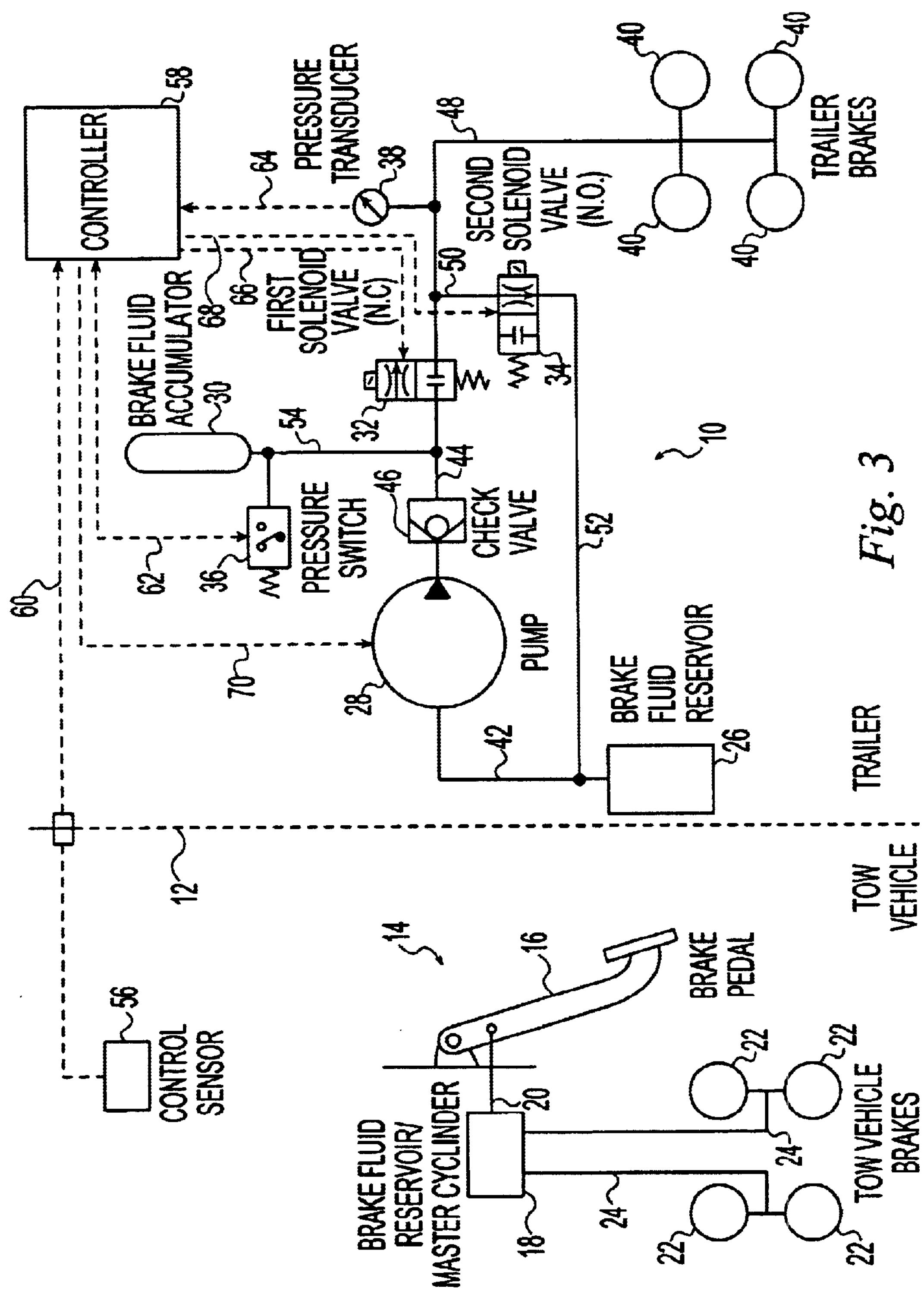
FIG. 3 is a schematic view showing another variation of the trailer brake system of FIG. 1 wherein the control sensor indicates deceleration of the tow vehicle.

As shown in FIG. 3, the control sensor 56 can also be carried by the tow vehicle and of a type adapted to sense deceleration. For example, the control censor can be an accelerometer carried by the tow vehicle. The accelerometer can sense how aggressive the tow vehicle braking and provide a proportional voltage which can be integrated into the controller 58. Preferably, a gain control is provided so that the operator can adjust system gain according to the load or weight carried by the trailer. For example, if the trailer is fully loaded, the system gain is set to match but if the trailer load is lighter the system gain is reduced or toned down. The vehicle operator can manually adjust the gain control as the trailer load changes.

Figure 4:
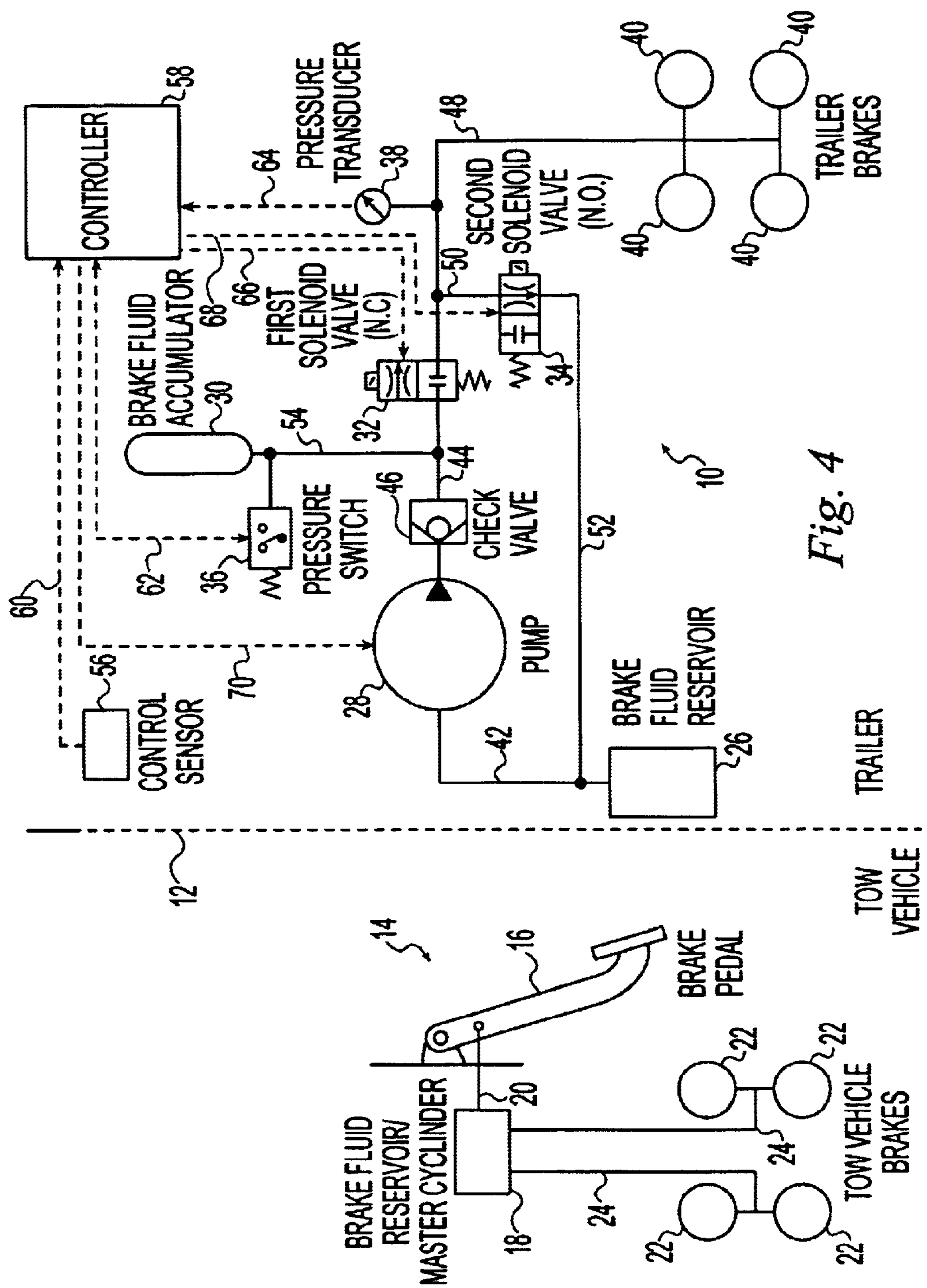
FIG. 4 is a schematic view showing yet another variation of the trailer brake system of FIG. 1 wherein the control sensor indicates deceleration of the trailer.

As shown in FIG. 4, the control sensor 56 can alternatively be carried by the trailer. In such a control circuit, the control sensor 56 is of a type which works independent of the tow vehicle to provide a signal which indicates that the tow vehicle braking system 14 has been actuated. For example, the control sensor can be an accelerometer carried by the trailer which indicates deceleration of the trailer. The accelerometer is preferably provided with a gain control as discussed above which can be carried by the tow vehicle or the trailer. When carried by the trailer, the control sensor 56 can advantageously be incorporated within the controller 58. An additional advantage the control sensor 56 being carried by the trailer is that no hard connections, hydraulic or electric, are required between the tow vehicle and the trailer.

As shown in FIG. 1, the illustrated control sensor 56 is in communication with the controller 58 by a suitable hard wire or wireless connection 60. The controller 58 is preferably provided with suitable memory means and processing means. The controller 58 can be connected to a suitable power source, provided with a suitable power source, or both. The controller 58 is in communication with the pressure switch 36 and the pressure transducer 38 via suitable connections 62, 64 to receive signals representative of pressures at the accumulator 30 and the trailer brakes 40 respectively. The controller 58 is connected to the first and second solenoid valves 32, 34 via suitable connections 66, 68 to selectively open and close the solenoid valves 32, 34 respectively. The controller 58 is preferably connected to the pump 28 via a suitable connection 70 to selectively operate the pump 28.

During operation of the trailer brake system 10, the controller 58 or pressure switch 36 selectively operates the pump 28 to charge the accumulator 30 with brake fluid at a predetermined pressure. The brake fluid in the accumulator 30 is held at this predetermined pressure in a stand-by state. When the tow vehicle brake system 14 is actuated, the control sensor 56 sends a signal to the controller 58. When the controller 58 receives this signal, the controller 58 initiates operation of the pump 28, closes the second solenoid valve 34, and opens the first solenoid valve 32 to quickly bring the trailer brakes 40 to a pressure set point desired by the controller 58. The accumulator 30 minimizes pressure rise time by quickly supplying pressurized brake fluid to the trailer brakes 40. It is noted that the accumulator 30 can alternatively be eliminated or supplemented by the controller 58 initially operating a variable-speed motor of the pump at a higher speed to reduce the pressure rise time.

When fluid pressure at the trailer brakes 40 reaches the pressure set point as indicated by a signal from the pressure transducer 38, the first and second solenoid valves 32, 34 are selectively closed and opened by the controller 58 to increase or dump pressure as necessary to maintain fluid pressure at the trailer brakes 40 at the desired pressure set point. It is noted that the pressure set point can be: (1) varied or changed to match or follow in a related manner the tow vehicle brake pressure or force as the signal from the control sensor 56 indicates the magnitude of the actuation of the tow vehicle brakes 22; (2) a predetermined pressure, particularly when the signal from the control sensor 56 indicates actuation of the tow vehicle brakes 22 but not the magnitude of the actuation; or (3) a combination of the two, that is, a predetermined pressure at times and matched to the tow vehicle brake pressure or force at other times such as, for example, a predetermined pressure set point at low actuations and a variable pressure set point at high actuations.

When the tow vehicle brakes 22 are released, the control sensor 56 sends a signal to the controller 58 and the controller 58 opens the second solenoid valve 34 and closes the first solenoid valve 32 so that pressure is dumped by returning brake fluid to the reservoir 26 through the second solenoid valve 34. The pump 28 continues to operate until the brake fluid in the accumulator 30 reaches the predetermined pressure. When the pressure switch 36 indicates that the brake fluid in the accumulator 30 has reached the predetermined pressure, the pump 28 is shut off. The trailer brake system 10 repeats the above described operations whenever the tow vehicle brake system 14 is actuated.

It is apparent from the above disclosure and detailed description that the present invention provides an improved hydraulic brake system 10 for a trailer which eliminates both the need for hydraulic brake fluid connections and/or electrical connections between the tow vehicle and trailer and the need for hydraulic actuators and/or master cylinders in the trailer brake system.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications and applications as are suited to the particular use contemplated. All such modifications and variations are within the scope of the present invention as determined by the appended claims when interpreted in accordance with the benefit to which they are fairly, legally, and equitably entitled.

What is claimed is:

1. A trailer brake system for a trailer being towed by a tow vehicle having a brake system, the trailer brake system comprising, in combination:

a control sensor adapted to provide a signal when the braking system of the tow vehicle is actuated;

at least one brake actuated by pressurized brake fluid;

a brake fluid reservoir;

a brake fluid pump connected to the brake fluid reservoir;

a first valve connected to the brake fluid pump and directly connected to the at least one brake;

a second valve directly connecting the at least one brake and the brake fluid reservoir;

a controller in communication with the control sensor, the first valve, and the second valve and adapted to open the first valve to increase braking force applied to the at least one brake and to open the second valve to decrease braking force to the at least one brake; and a feedback sensor in communication with the controller and capable of generating a signal that represents braking force applied to the at least one brake.

2. The trailer brake system according to claim 1, further comprising an accumulator adapted to hold pressurized brake fluid and connected to the first valve to provide pressurized brake fluid thereto and connected to the brake fluid pump to receive brake fluid therefrom.

3. The trailer brake system according to claim 1, wherein the control sensor is adapted to be carried by the tow vehicle.

4. The trailer brake system according to claim 3, wherein the control sensor is a pedal movement sensor.

5. The trailer brake system according to claim 3, wherein the control sensor is a brake fluid pressure sensor.

6. The trailer brake system according to claim 2, wherein the control sensor is adapted to be carried by the tow vehicle.

7. The trailer brake system according to claim 6, wherein the control sensor is a brake fluid pressure sensor.

8. The trailer brake system according to claim 1, wherein the controller is adapted to automatically provide a predetermined braking force when the controller receives a signal from the control sensor indicating the braking system of the tow vehicle is actuated.

9. The trailer brake system according to claim 8, wherein the control sensor indicates the degree to which the braking system of the tow vehicle is actuated and the controller is adapted to automatically provide different predetermined braking forces depending on the degree to which the braking system of the tow vehicle is actuated.

10. The trailer brake system according to claim 1, wherein the control sensor indicates the degree to which the braking system of the tow vehicle is actuated and the controller is adapted to automatically provide different braking forces depending on the degree to which the braking system of the tow vehicle is actuated.

11. The trailer brake system according to claim 1, wherein the control sensor includes an accelerometer.

12. A trailer brake system for a trailer being towed by a tow vehicle having a brake system, the trailer brake system comprising, in combination:

a control sensor adapted to provide a signal when the braking system of the tow vehicle is actuated;

at least one brake actuated by pressurized brake fluid;

a source of pressurized brake fluid;

a brake fluid reservoir connected to the source of pressurized brake fluid;

a first valve connected to the source of pressurized brake fluid and directly connected to the at least one brake;

a second valve directly connecting the at least one brake and the brake fluid reservoir;

a controller in communication with the control sensor, the first valve, and the second valve and adapted to open the first valve to increase braking force applied to the at least one brake and to open the second valve to decrease braking force to the at least one brake; and a feedback sensor in communication with the controller and capable of generating a signal that represents braking force applied to the at least one brake.

13. The trailer brake system according to claim 12, wherein the source of pressurized brake fluid includes an accumulator adapted to hold pressurized brake fluid.

14. The trailer brake system according to claim 12, further comprising a brake fluid pump connecting the brake fluid reservoir and the source of pressurized brake fluid.

15. The trailer brake system according to claim 12, wherein the control sensor is adapted to be carried by the tow vehicle.

16. The trailer brake system according to claim 12, wherein the control sensor is adapted to be carried by the trailer.

17. The trailer brake system according to claim 12, wherein the controller is adapted to automatically provide a predetermined braking force when the controller receives a signal from the control sensor indicating the braking system of the tow vehicle is actuated.

18. The trailer brake system according to claim 17, wherein the control sensor indicates the degree to which the braking system of the tow vehicle is actuated and the controller is adapted to automatically provide different predetermined braking forces depending on the degree to which the braking system of the tow vehicle is actuated.

19. The trailer brake system according to claim 12, wherein the control sensor indicates the degree to which the braking system of the tow vehicle is actuated and the controller is adapted to automatically provide different braking forces depending on the degree to which the braking system of the tow vehicle is actuated.

20. The trailer brake system according to claim 12, wherein the control sensor includes an accelerometer.

21. A trailer brake system for a trailer being towed by a tow vehicle having a brake system, the trailer brake system comprising, in combination:

a control sensor adapted to provide a signal when the braking system of the tow vehicle is actuated;

at least one brake actuated by pressurized brake fluid;

a brake fluid reservoir;

a brake fluid pump connected to the brake fluid reservoir;

a first solenoid valve connected to the brake fluid pump and directly connected to the at least one brake;

an accumulator adapted to hold pressurized brake fluid and connected to the first solenoid valve to provide pressurized brake fluid thereto and connected to the brake fluid pump to receive brake fluid therefrom;

a second solenoid valve directly connecting the at least one brake and the brake fluid reservoir;

a controller in communication with the control sensor, the first solenoid valve, and the second solenoid valve and adapted to open the first solenoid valve to increase braking force applied to the at least one brake and to open the second solenoid valve to decrease braking force to the at least one brake;

a feedback sensor in communication with the controller and capable of generating a signal that represents braking force applied to the at least one brake; and wherein the controller is adapted to automatically provide a predetermined braking force to the at least one brake by opening and closing the first and second solenoid valves when the controller receives a signal from the control sensor indicating the braking system of the tow vehicle is actuated.

22. The trailer brake system according to claim 21, wherein the control sensor indicates the degree to which the braking system of the tow vehicle is actuated and the controller is adapted to automatically provide different predetermined braking forces depending on the degree to which the braking system of the tow vehicle is actuated.

23. The trailer brake system according to claim 21, wherein the control sensor includes an accelerometer.

* * * * *